United States Patent
Obbink et al.

(10) Patent No.: US 9,867,335 B1
(45) Date of Patent: Jan. 16, 2018

(54) AUTOMATIC TENSIONING CONTROL DECK PLATE SYSTEM

(71) Applicants: Brian R. Obbink, Armstrong, IA (US); Nicholas Obbink, Armstrong, IA (US)

(72) Inventors: Brian R. Obbink, Armstrong, IA (US); Nicholas Obbink, Armstrong, IA (US)

( * ) Notice: Subject to any disclaimer, the term of this patent is extended or adjusted under 35 U.S.C. 154(b) by 0 days.

(21) Appl. No.: 15/421,886

(22) Filed: Feb. 1, 2017

Related U.S. Application Data (60) Provisional application No. 62/289,407, filed on Feb. 1, 2016.

(51) Int. Cl.
   *A01D 45/02* (2006.01)
   *A01D 41/06* (2006.01)
   *A01D 34/01* (2006.01)

(52) U.S. Cl.
   CPC ......... *A01D 45/021* (2013.01); *A01D 34/015* (2013.01); *A01D 41/06* (2013.01)

(58) Field of Classification Search
   CPC .. A01D 45/021; A01D 45/023; A01D 45/025; A01D 41/127; A01D 41/1273
   See application file for complete search history.

(56) References Cited

U.S. PATENT DOCUMENTS

| | | | | |
|---|---|---|---|---|
| 3,101,579 A | * | 8/1963 | Karlsson | A01D 45/021 56/105 |
| 3,126,690 A | * | 3/1964 | Keller et al. | A01D 45/025 56/107 |
| 3,262,255 A | * | 7/1966 | Karlsson | A01D 45/025 56/107 |
| 3,271,940 A | * | 9/1966 | Ashton | A01D 41/141 56/105 |
| 3,589,110 A | * | 6/1971 | Schreiner | A01D 41/142 56/106 |
| RE27,554 E | * | 1/1973 | Ashton | A01D 45/021 56/105 |
| 4,438,619 A | | 3/1984 | Heim et al. | |
| 4,531,351 A | | 7/1985 | Sousek | |
| 5,060,464 A | * | 10/1991 | Caron | A01D 45/021 56/119 |
| 5,680,750 A | * | 10/1997 | Stefl | A01D 45/021 56/119 |
| 5,878,559 A | * | 3/1999 | Cooksey | A01D 45/023 56/104 |
| 5,878,561 A | * | 3/1999 | Gunn | A01D 45/023 56/119 |
| 6,226,969 B1 | | 5/2001 | Becker | |
| 6,237,312 B1 | * | 5/2001 | Becker | A01D 45/021 56/119 |
| 7,913,480 B2 | * | 3/2011 | Christensen | A01D 45/021 56/119 |
| 8,220,235 B2 | | 7/2012 | Kowalchuk | |
| 9,232,693 B2 | * | 1/2016 | Hendrickson | A01D 45/025 |
| 9,320,196 B2 | * | 4/2016 | Dybro | A01D 45/021 |
| 9,408,348 B2 | * | 8/2016 | Walker | A01D 45/028 |
| 2008/0092507 A1 | | 4/2008 | Bollig | |

(Continued)

*Primary Examiner* — Arpad Fabian-Kovacs
(74) *Attorney, Agent, or Firm* — Robert C. Montgomery; Montgomery Patent Design, L.P.

(57) ABSTRACT

A compliant deck tension device, and a pair of proprietary deck plates enables a combine harvester to compensate for diameter variations in corn stalks as they are guided into the combine harvester.

14 Claims, 8 Drawing Sheets

(56) References Cited

U.S. PATENT DOCUMENTS

| | | | |
|---|---|---|---|
| 2011/0011048 A1* | 1/2011 | Hoffman | A01D 45/023 56/119 |
| 2011/0146217 A1* | 6/2011 | Carboni | A01D 45/021 56/60 |
| 2011/0146218 A1* | 6/2011 | Carboni | A01D 45/021 56/62 |
| 2011/0173942 A1* | 7/2011 | Kowalchuk | A01D 45/021 56/62 |
| 2012/0029757 A1* | 2/2012 | Kowalchuk | A01D 45/021 701/34.2 |
| 2013/0283748 A1 | 10/2013 | Funk et al. | |
| 2014/0053524 A1* | 2/2014 | Werning | A01D 45/021 56/62 |
| 2014/0150394 A1* | 6/2014 | Calmer | A01D 45/021 56/106 |
| 2014/0230392 A1 | 8/2014 | Dybro et al. | |
| 2014/0331633 A1* | 11/2014 | Vandeven | A01D 45/021 56/62 |
| 2015/0208580 A1 | 7/2015 | Walker et al. | |
| 2016/0174461 A1* | 6/2016 | Walker | A01D 45/021 56/119 |
| 2016/0174462 A1* | 6/2016 | Walker | A01D 45/021 56/119 |
| 2016/0174463 A1* | 6/2016 | Barry | A01D 45/021 56/62 |

\* cited by examiner

AUTOMATIC TENSIONING CONTROL DECK PLATE SYSTEM

RELATED APPLICATIONS

The present invention is a continuation-in-part of, was first described in and claims the benefit of U.S. Provisional Application No. 62/289,407 filed Feb. 1, 2016, the entire disclosures of which are incorporated herein by reference.

FIELD OF THE INVENTION

The present invention relates generally to a system comprising a compliant deck plate tensioning device and proprietary deck plates that enables a combine harvester to compensate for diameter variations in corn stalks as they are guided into the combine harvester. Use of the device is intended to prevent butt-shelling and grain loss during a corn harvesting process.

BACKGROUND OF THE INVENTION

Harvesting grains is one (1) of the most difficult jobs to master, particularly with older equipment that is difficult to use or maintain. Therefore, a combine harvester has been invented that aids in quickly harvesting multiple rows of grain at a single pass. Such combines are equipped with means to add specific attachments, or "heads", depending on the type of grain that needs to be harvested.

These heads can be mechanically adjusted with the use of hydraulics. With corn harvesting, the corn head includes a deck plate assembly having a pair of deck plates that is actuated by the hydraulics to adjust to the size of the corn stalk, the width between the rows, etc., in order to maximize the amount of grain that passes through the harvester. However, it is a desire on the part of the inventors to provide an automatic adjustment of the deck plates to separate the ear of the corn at the stalk, while minimizing any separation or degradation of the husk, in order to better conserve the corn when it is further processed by the combine. It is also a desire of the inventors to provide such adjustments easily at the control panel within the cab of the combine and at the deck plate itself. It is also a benefit to have such a means to be able to be quickly and efficiently mounted with minimal tools.

The present invention is beneficial over other similar automatic adjustable deck plate systems that only travel in a minimal range and thus cannot effectively be cleared of debris such as mud, snow, chaff, rust or other foreign material.

Various attempts have been made to solve problems found in automatic deck plate art. Among these are found in: U.S. Pat. and Pat. App. Pub. Nos. 2015/0208580 to Walker et al., 2008/0092507 to Bollig, U.S. Pat. No. 4,531,351 to Sousek, U.S. Pat. No. 6,226,969 to Becker, 2014/0230392 to Dybro et al., and U.S. Pat. No. 8,220,235 to Kowalchuk. These prior art references are representative of adjustable deck plates.

None of the above inventions and patents, taken either singly or in combination, is seen to describe the invention as claimed. Thus, a need exists for a reliable automatically adjustable deck plate devices and to avoid the above-mentioned problems.

SUMMARY OF THE INVENTION

The inventor has recognized the aforementioned inherent problems and lack in the art and observed that there is a need for an automatically adjustable deck plate.

It is therefore an object of the invention to provide a tensioning system, comprising of a tensioning device, a first deck plate and a second deck plate. The tensioning device has a frame assembly which is configured to securely clamp onto a deck plate control rod of a deck plate assembly of a corn head attachment for a combine harvester, a torque assembly which is affixed within a lower portion of the frame assembly and a pivot plate assembly which is affixed to a first face of the frame assembly and is configured to pivotally attach to an adjuster arm of the deck plate assembly of the corn head attachment for the combine harvester. The pivot plate assembly has a flexible axial attachment to the torque assembly. The first deck plate is configured to be secured to a top surface of the deck plate assembly while the second deck plate is configured to be moveably secured to the top surface of the deck plate assembly. The torque assembly is configured to provide an axially compliant connection between the deck plate control rod and the adjuster arm of the deck plate assembly of the corn head attachment for the combine harvester. In an alternate embodiment, the first and second deck plates may be provided separately from the tensioning device.

The first deck plate includes a pair of first fastener slots which are disposed through a first face and a second face of the first deck plate and a first wear edge which is disposed along a lengthwise first side of the first deck plate. The second deck plate includes a pair of second fastener slots which are disposed through a first face and a second face of the second deck plate, a pair of bell crank pins which are disposed through the first face and the second face of the second deck plate adjacent each of the second fastener slots, a plurality of glide buttons which are disposed through the first face and the second face of the second deck plate adjacent each the second fastener slots and each of the bell crank pins and a second wear edge which is disposed along a lengthwise first side of the second deck plate. The first wear edge may face the second wear edge and defines a groove therebetween while the tensioning device permits the groove to adjust based upon a diameter of a given corn stalk passing between the first deck plate and the second deck plate.

The first and second wear edges each includes an abrasion resistant steel. The frame assembly may further include a first side plate, which has an open and curved first slot along an upper first side, a second side plate, parallel to the first side plate, having an open and curved second slot along an upper first side, a third side plate perpendicularly secured between the first side plate and the second side plate opposite the first slot and the second slot, a clamp plate positioned between the first side plate and the second side plate opposite the third side plate, further having opposing parallel pivot features which protrude through the first side plate subjacent the first slot and the second side plate subjacent the second slot and a clamp bolt which is affixed to the clamp plate while engaging with the third side plate subjacent the first slot and the second slot. The torque assembly is secured between a lower portion of the first side plate and the second side plate while the deck plate control rod is configured to rest within the first slot and the second slot while secured between the clamp plate and the third side plate.

The torque assembly may include a hollow torque tube, a torque axle disposed longitudinally within the torque tube which has a first end projecting out of the torque tube, away from the frame assembly and secured within a lower portion of the pivot plate assembly and a plurality of compression elements which are retained within the torque tube and encompass the torque axle. The plurality of compression elements comprises a rubber material having a durometer and composition permitting said adjuster arm to move radially no more than one inch (1 in.) in a same direction as the torque tube.

The pivot plate assembly includes a pivot plate and a pivot plate bushing which extends perpendicularly from the pivot plate. The pivot plate bushing is configured to be inserted within and mechanically attached to the adjuster arm while the torque tube is secured within the pivot plate subjacent the pivot plate bushing. The pivot plate bushing may be welded to the pivot plate.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 tensioning device
20 frame assembly
22a first side plate
22b second side plate
22c third side plate
25 interlocking feature
26 clamp plate
27 pivot feature
28a first slot
28b second slot
30 clamp bolt
32 clamp bolt washer
50 pivot plate assembly
52 pivot plate
54 pivot plate bushing
56 pivot plate washer
58 pivot plate bolt
80 torque assembly
82 torque tube
84 torque axle
86 compression element
100 combine harvester
110 corn head
115 row unit
120 deck plate control rod
125 adjuster arm
130 deck plate assembly
131 first deck plate
132 second deck plate
133 wear edge
134 glide button
135 bell crank pin
136 fastener slot
137 groove
138 adjuster arm movement

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a self-adjusting deck plate tension system having a device (herein described as the "device") 10, which provides a means to modify existing corn head portions 110 of a combine harvester 100 having hydraulically adjustable deck plate assemblies 130, having a first deck plate 131 and a second deck plate 132, so as to compensate for diameter variations in corn stalks as they are guided into the combine harvester 100. Use of the device 10 in conjunction with the first deck plate 131 and the second deck plate 132 is intended to prevent butt-shelling and grain loss during a corn harvesting process.

Figure 1:
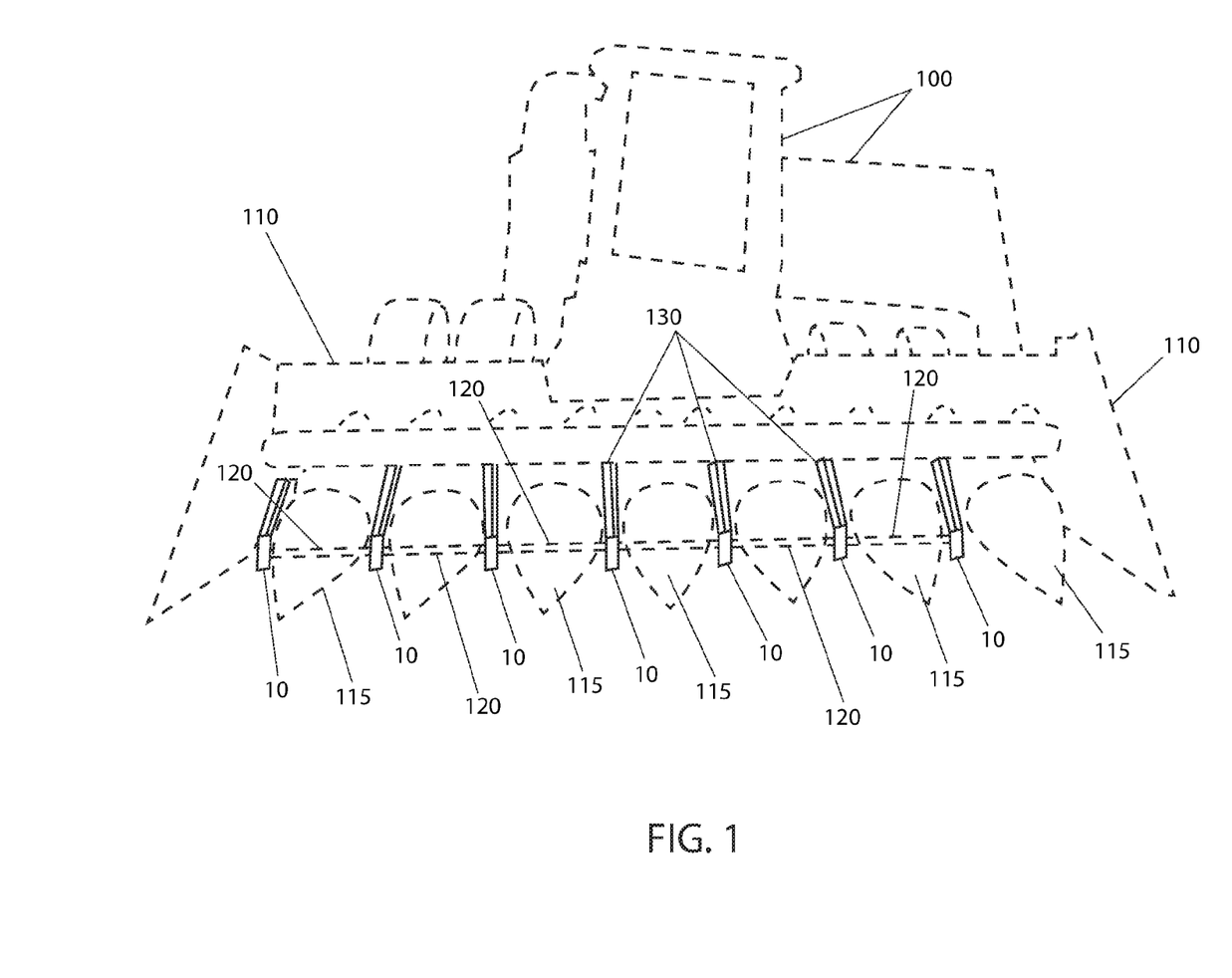
FIG. 1 is an environmental view of a tensioning device 10, for a corn harvester 100, according to a preferred embodiment of the present invention.

Referring now to FIG. 1, an environmental view of the device 10, according to the preferred embodiment of the present invention, is disclosed. As seen here, a combine harvester 100 has been retrofitted with a plurality of units of the device 10, one (1) being installed onto each row unit 115 of the corn head 110. The device 10 provides an axially compliant connection between a deck plate control rod 120 and an adjuster arm portion 125 of each deck plate assembly 130. Each deck plate assembly 130 establishes a linear slot through which each corn stalk is guided as it enters the combine harvester 100. Utilization of the device 10 enables automatic adjustment of the slot widths resulting in smooth guidance of corn stalks having different diameters, through the deck plate assemblies 130 and into the combine harvester 100.

Figure 2A:
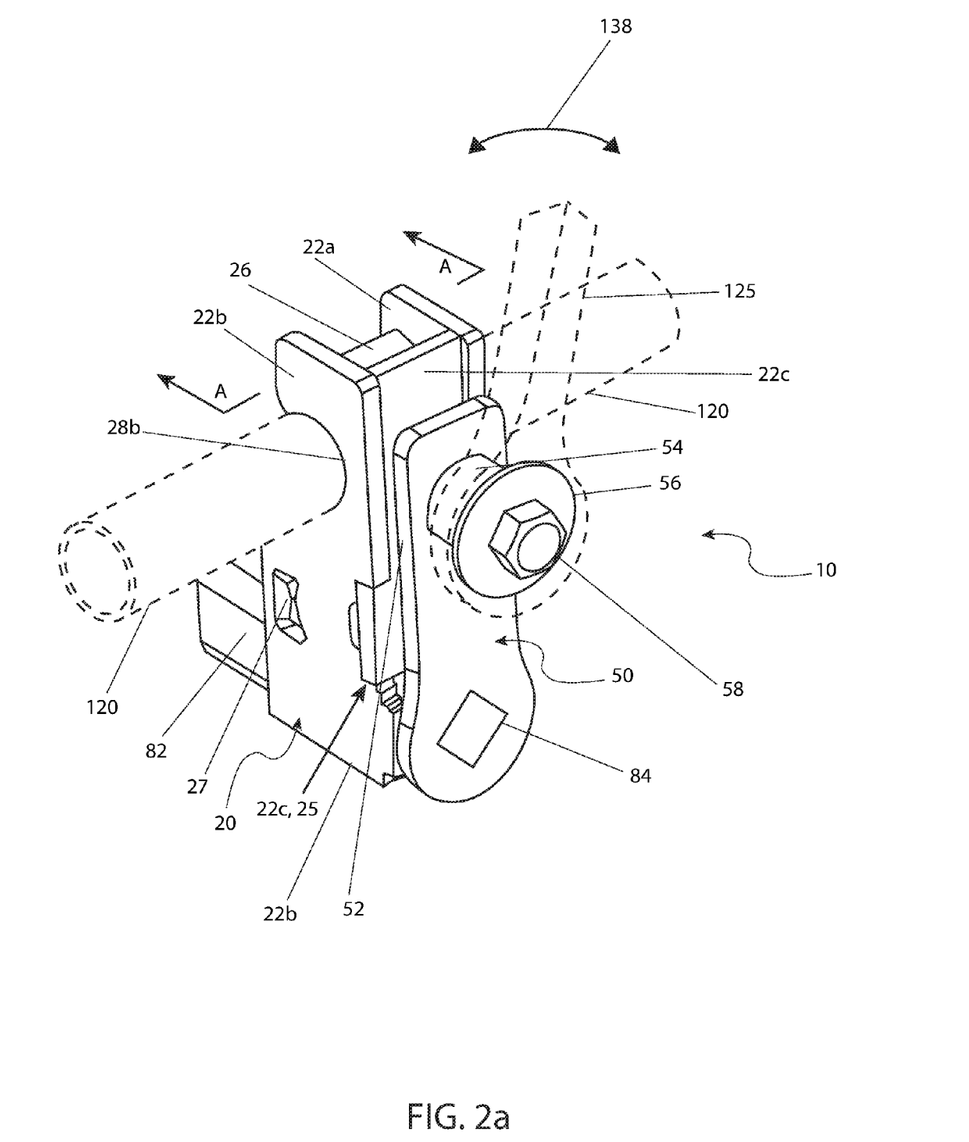
FIG. 2a is a top isometric view of the tensioning device 10, according to a preferred embodiment of the present invention.
Figure 2B:
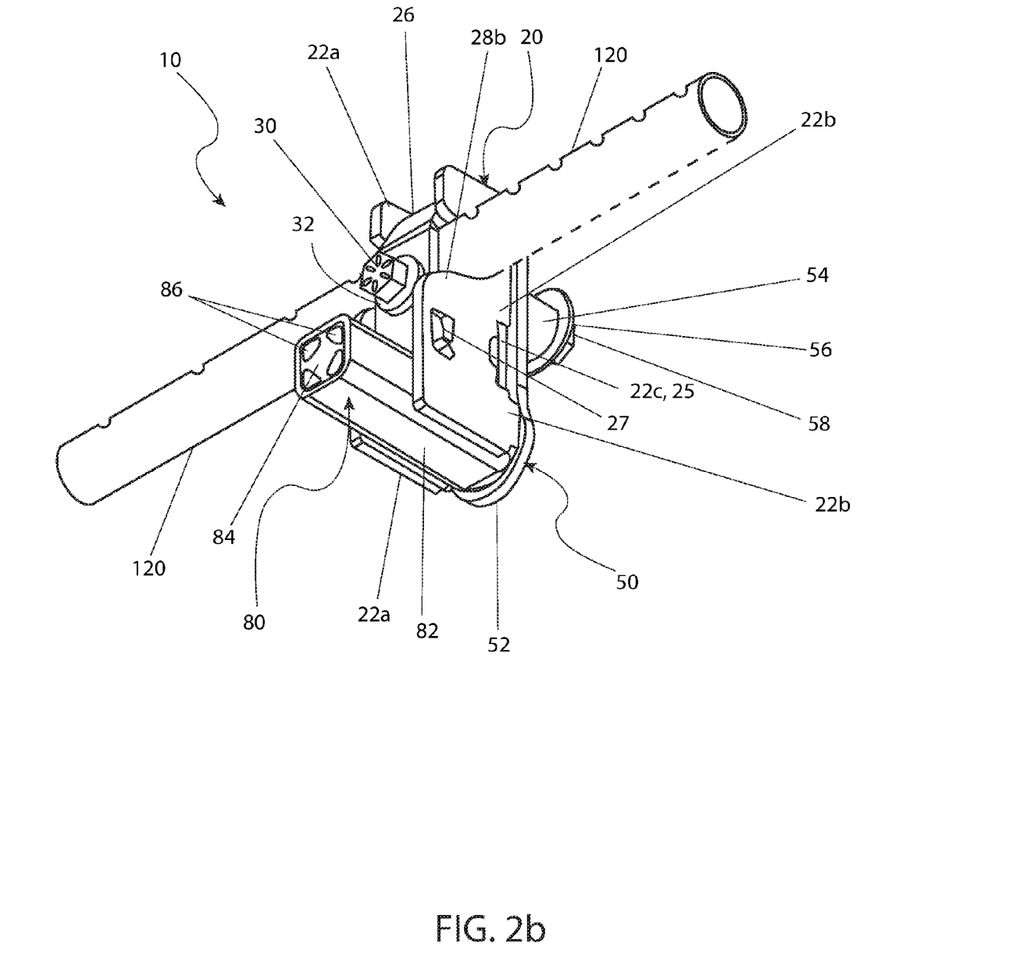
FIG. 2b is a bottom isometric view of the tensioning device 10, according to a preferred embodiment of the present invention.

Referring now to FIGS. 2a and 2b, top and bottom isometric views of the device 10, according to the preferred embodiment of the present invention, are disclosed. Each device 10 includes a frame assembly 20, a pivot plate assembly 50, and an interconnecting torque assembly 80. Each device 10 acts to join the deck plate control rod 120 to an adjuster arm portion 125 of each deck plate assembly 130 in an axially flexible manner via the torque assembly 80. It is envisioned that the existing deck plate control rod 120 is a hydraulically-motioned linear member in mechanical communication with all of the deck plate adjuster arms 125 of the corn head 110, thereby being capable of adjusting all the deck plate assemblies 130 in a synchronous manner.

The frame assembly 20 provides a means to clamp the device 10 to the deck plate control rod 120. The frame assembly 20 provides a rectangular box structure including members being assembled or joined via interlocking features 25, welding, or metal forming. The frame assembly 20 includes a first side plate 22a, a second side plate 22b, a third side plate 22c, and a clamp plate 26. The first 22a and second 22b side plates are arranged in a parallel manner, and are to be mirror-images of each other having respective semi-circular first slot 28a and second slot 28b portions. The slots 28a, 28b along with a clamp plate 26 act to encompass and secure the device 10 upon the cylindrical deck plate control rod 120. The clamp plate 26 is to be positioned between the first 22a and second 22b side plates in a perpendicular manner. The clamp plate 26 is shown here having opposing pivot features 27 located along a bottom edge portion which protrude through the first 22a and second 22b side plates to form a rotating axis. A top portion of the clamp plate 26 provides an arcuate shape which wraps partially around the deck plate control rod 120 in a parallel manner. The device 10 is then securely clamped along the deck plate control rod 120 via installation and tightening of a clamp bolt portion 30 of the clamp plate 26 which is to threadingly engage the third side plate 22c (also see FIG. 3).

The frame assembly 20 also provides a means to secure and position the torque assembly 80 via welding or equivalent permanent metal-joining process. The torque assembly 80 in turn provides a flexible axial attachment of the pivot plate assembly 50 via a torque axle 84 which is mounted within a plurality of compression elements 86 (see FIG. 3). The pivot plate assembly 50 further includes an upwardly extending pivot plate 52 having a perpendicularly extending pivot plate bushing 54 at an upper end location, being either unitary or mounted thereto using welding or an equivalent metal joining process. The pivot plate bushing 54 is to have a cylindrical shape having a specific diameter which enables snug rotational insertion into a bolt-hole portion of the adjuster arm 125. The adjuster arm 125 is mechanically retained upon the pivot plate bushing 54 via a pivot plate washer 56 and a pivot plate bolt 58.

Figure 3:
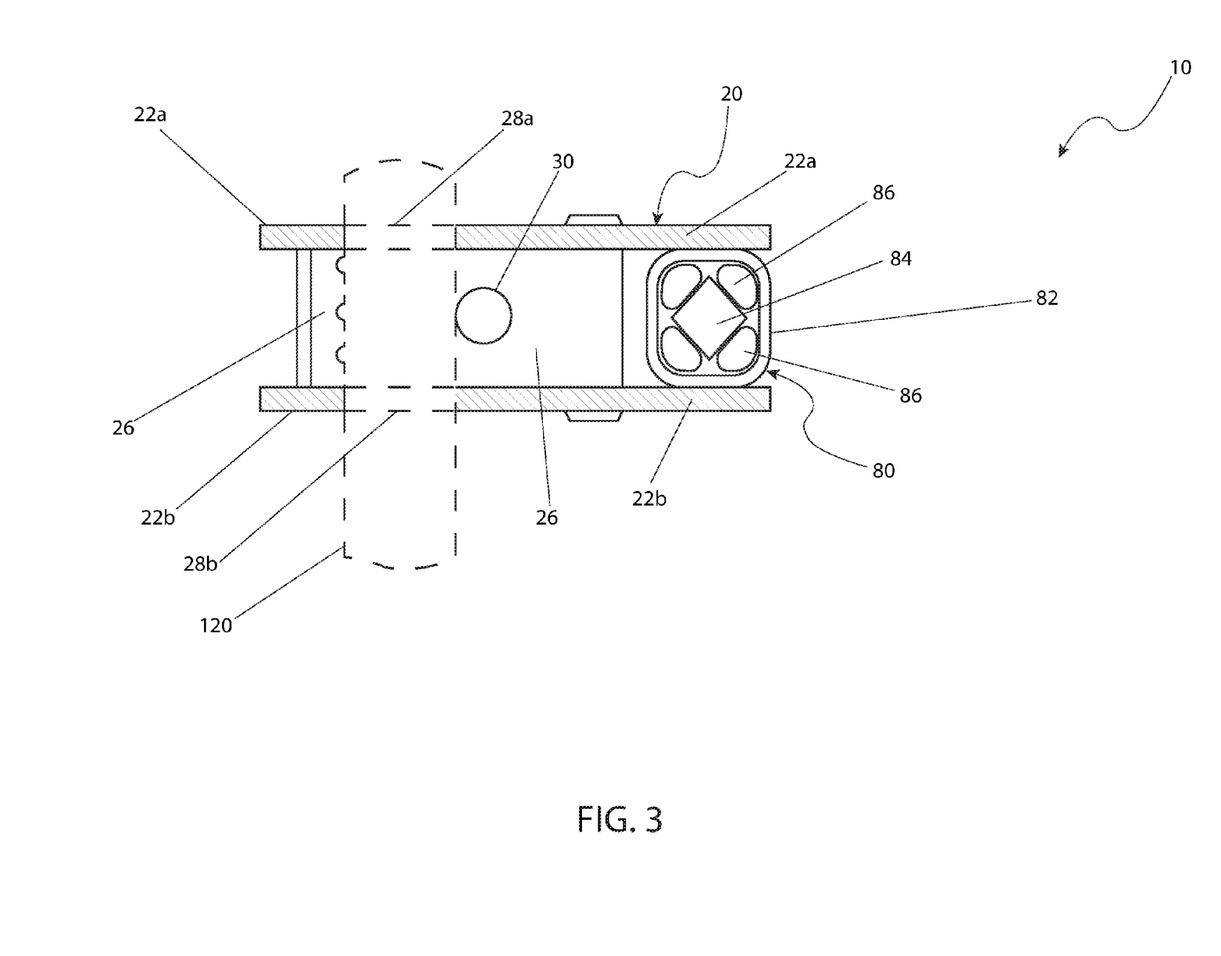
FIG. 3 is a sectional view of the tensioning device 10 taken along section line A-A (see FIG. 2), according to a preferred embodiment of the present invention.

Referring now to FIG. 3, a sectional view of the device 10 taken along section line A-A (see FIG. 2a), according to a preferred embodiment of the present invention, is disclosed. The torque assembly 80 provides a torque actuated axial member which includes a stationary hollow torque tube 82 which contains a linear torque axle 84 having a polygonal cross-sectional shape such as a square. The torque axle 84 is mounted within the torque tube 82 in a centralized parallel manner, being partially or completely surrounded by a plurality of compression elements 86 so as to enable limited rotation of the torque axle 84 with respect to the torque tube 82. The compression elements 86 are envisioned to be made using rubber cord, "O"-ring stock, or an equivalent compressible material, envisioned to have a round cross-sectional shape. The compression elements 86 are to extend the length of the torque tube 82, being parallel to the torque axle 84. Each compression element 86 is to be positioned against an inner corner of the torque tube 82 and against a flat side portion of the torque axle 84, thereby enabling limited rotation of the torque axle 84 as a torsional force is applied. The compression elements 86 also act to return the torque axle 84 to a "rest position" within the torque tube 82. It is envisioned that the compression elements 86 would be made using a rubber material having a durometer and a composition which would allow the adjuster arm 125 to travel radially approximately one inch (1 in.) in the same direction 138 as the torque tube 82 as the torsional force is applied by the deck plate assemblies 130, thereby allowing the deck plate assemblies 130 to open and close tightly upon a corn stalk to allow efficient shearing of the corn ears from the stalk. In another embodiment, the plurality of compression elements 86 comprise a rubber material having a durometer and composition permitting said adjuster arm 125 to move radially no more than one inch (1 in.) in a same direction as the torque tube 82.

Figure 4:
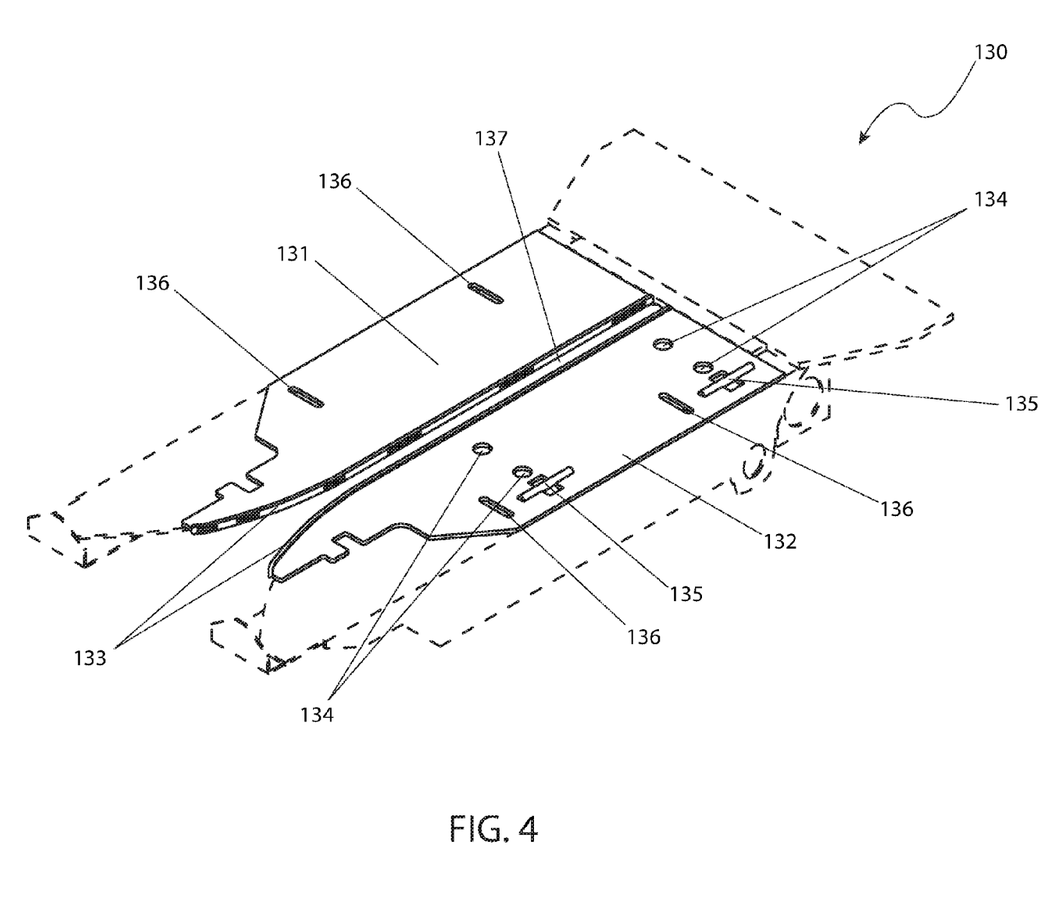
FIG. 4 is an environmental view of a deck plate assembly 130 with a top perspective view of a first deck plate 131 and top perspective view of a second deck plate 132, according to a preferred embodiment of the present invention.
Figure 5:
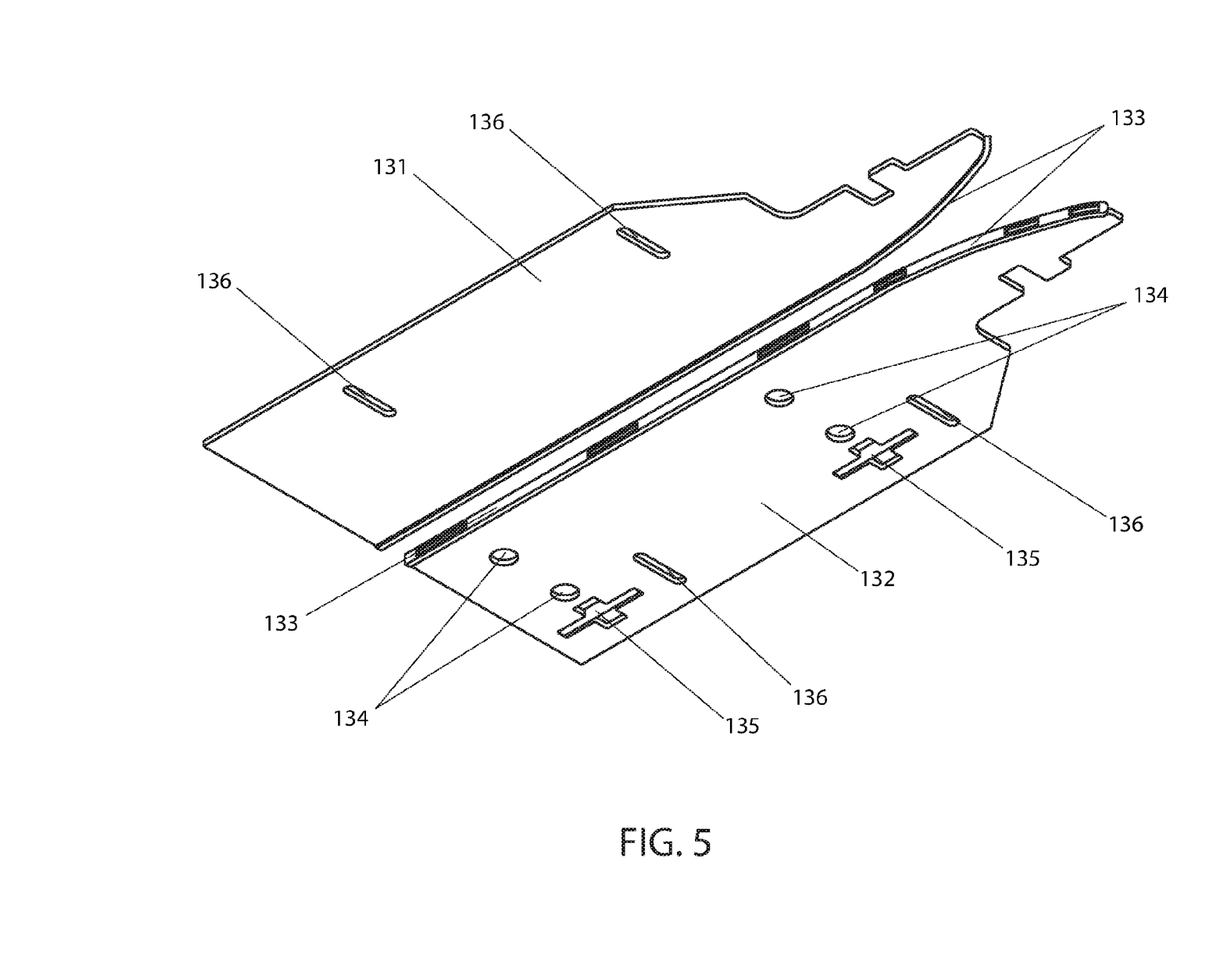
FIG. 5 is a bottom perspective view of the first deck plate 131 and bottom perspective view of the second deck plate 132, according to a preferred embodiment of the present invention.
Figure 6:
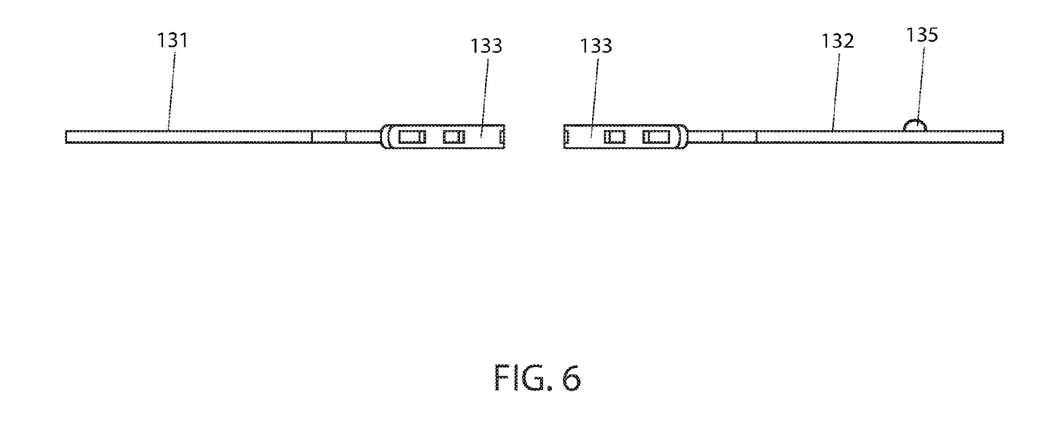
FIG. 6 is a front view of the first deck plate 131 and a front view of the second deck plate 132, according to a preferred embodiment of the present invention.
Figure 7:
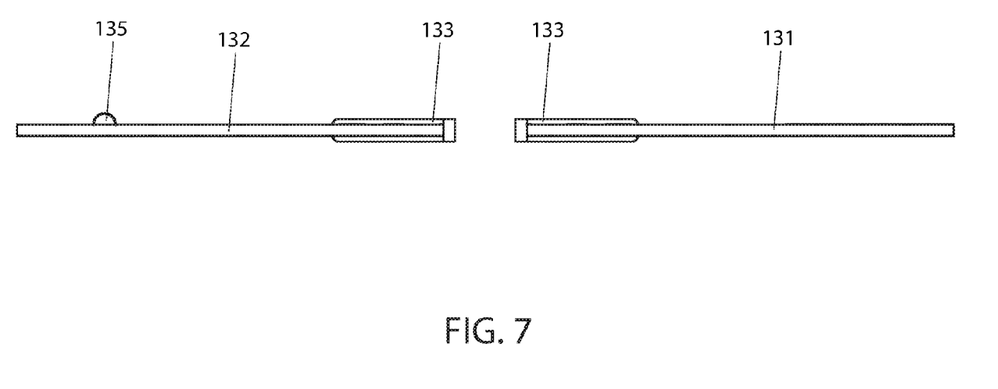
FIG. 7 is a rear view of the first deck plate 131 and a rear view of the second deck plate 132, according to a preferred embodiment of the present invention; and, FIG. 8 is a top view the first deck plate 131 and a top view of the second deck plate 132 with a bottom each being identical.
Figure 8:
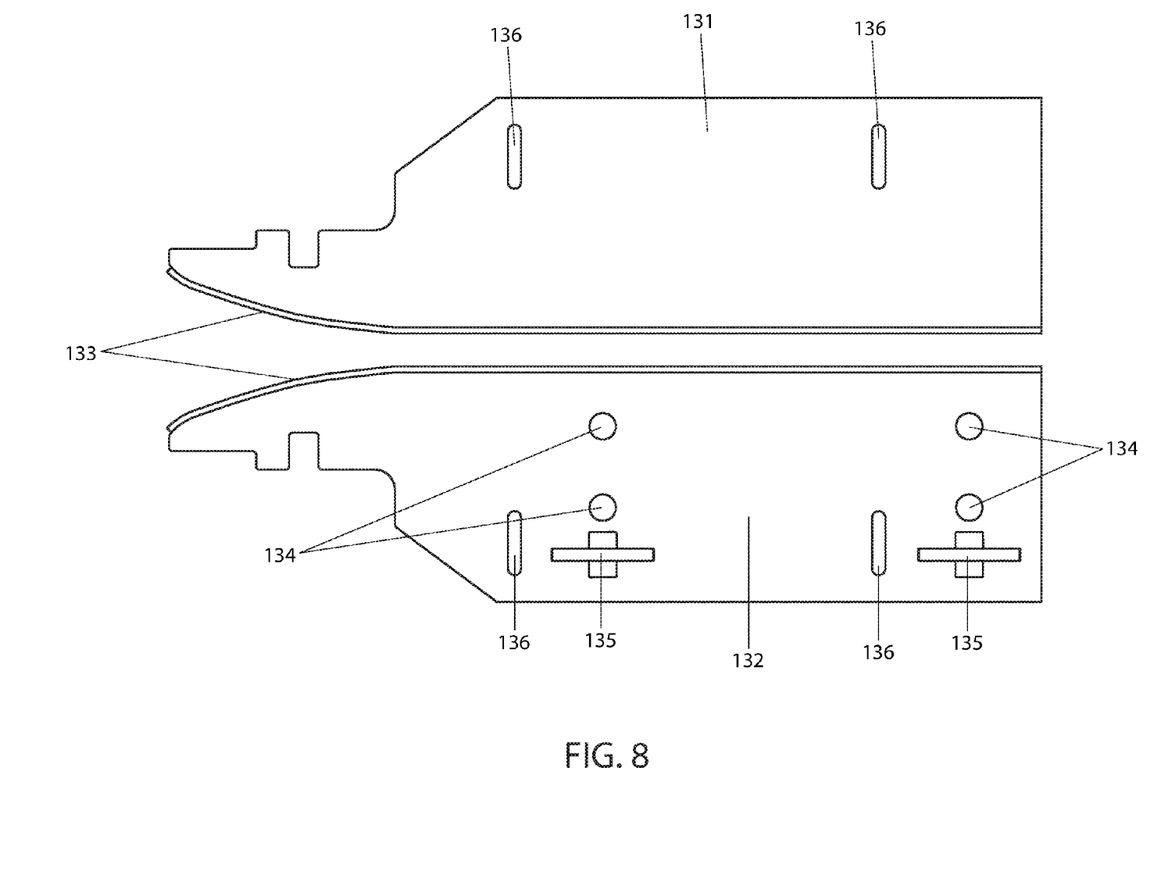

Referring now to FIG. 4, an environmental view of a deck plate assembly 130 with a top perspective view of the first deck plate 131 and top perspective view of the second deck plate 132, according to a preferred embodiment of the present invention, FIG. 5, a bottom perspective view of the first deck plate 131 and bottom perspective view of the second deck plate 132, according to a preferred embodiment of the present invention, FIG. 6, a front view of the first deck plate 131 and a front view of the second deck plate 132, according to a preferred embodiment of the present invention, FIG. 7, a rear view of the first deck plate 131 and a rear view of the second deck plate 132, according to a preferred embodiment of the present invention and, FIG. 8 a top view the first deck plate 131 and a top view of the second deck plate 132 with a bottom each being identical.

The first deck plate has at least two fastener slots 136 and a wear edge 133. The second deck plate has a plurality of guide buttons 134, a pair of bell crank pins 135 and a wear edge 133. The first deck plate 131 and second deck plate 132 are installed upon the top of a given deck plate assembly 130 with each deck plate wear edge 133 being made of an abrasion resistant steel such as AR400 (please see FIGS. 4-8).

When a corn harvester 100 is outfitted with the device 10 and the first deck plate 131 and second deck plate 132, for each respective deck plate assembly, each wear edge 133 has adjustable pressure placed on each corn stalk entering the groove 137 between each wear edge 133 of each first deck plate 131 and second deck plate 132. This adjustable pressure results in the keeping of the husk of the corn ear intact. With the husk around each harvested ear of corn intact, the amount of corn lost during the harvesting process is dramatically reduced.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1 and 2a.

The method of utilizing the device 10 may be achieved by performing the following steps: procuring a number of units of the device 10 corresponding to a number of row units 115 on a corn head 110; raising the corn head 110 to a height sufficient to access the bottom of the row unit 115; securing the corn head 110 securely in its raised position using appropriate safety features and equipment; loosening and sliding the original brackets out of the way; installing one (1) device 10 by hooking the slot portions 28a, 28b of the first 22a and second 22b side plates over the deck plate control rod 120; rotating the clamp plate 26 upwardly against the deck plate control rod 120; installing the clamp bolt 30 in a finger-tight manner; mounting the device 10 to the adjuster arm 125 by inserting the pivot plate bushing 54 into a bolt-hole portion of the adjuster arm 125; installing the pivot plate washer 56 and pivot plate bolt 58; tightening the pivot plate bolt 58; setting the hydraulic adjustment of the deck plate assembly 130 to a "smallest stalk" position; tightening the pivot plate 52 to the deck plate control rod 120 by tightening the pivot plate bolt 58; repeating the above steps to install all remaining units of the device 10 onto the deck plate control rod 120 and respective adjustment arms 125; lowering the corn head 110 to its normal operating position; operating the combine harvester 100 in a normal manner; allowing the deck plate assemblies 130, each fitted first deck plate 131 and second deck plate 132, to open and close around the small as well as large corn stalks; and, benefiting from efficient corn ear separation and reduced kernel losses during harvesting, afforded a user off the present invention 10.

As busy as today's combine harvester operator is having to unload grain on the go, and having to watch all critical functions of the combine harvester 100, the device 10 frees the operator from the burden of possible miss-adjustment at the deck plate assemblies 130, thereby avoiding lower yields due to grain loss at the head. The embodiment of the device 10 illustrated herein is particularly useful when utilized upon popular models of combine harvesters 100 such as the JOHN DEERE® "40 series", "90 series", and the "600 series". A unit of the device 10 is intended to be installed upon every row unit 115 to provide maximum effectiveness. The procuring and installing of the devices 10 upon an existing combine harvester 100 is expected to provide a cost savings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A tensioning system, comprising:
    a tensioning device comprising:
        a frame assembly, having a first side plate, a second side plate disposed parallel to said first side plate, a third side plate perpendicularly secured between said first side plate and said second side plate, and a clamp plate positioned between said first side plate, and said second side plate opposite said third side plate, said clamp plate configured to securely clamp onto a deck plate control rod of a deck plate assembly of a corn head attachment for a combine harvester;
        a pivot plate assembly, affixed to a first face of said frame assembly, configured to pivotally attach to an adjuster arm of said deck plate assembly of said corn head attachment for said combine harvester;
        a torque assembly, affixed within a lower portion of said frame assembly, further comprising:
            a hollow torque tube;
            a torque axle disposed longitudinally within said torque tube having a first end projecting out of said torque tube, away from said frame assembly and secured within a lower portion of said pivot plate assembly; and,
            a plurality of compression elements retained within said torque tube and encompassing said torque axle; and,
    a first deck plate configured to be secured to a top surface of said deck plate assembly, comprising:
        a pair of first fastener slots disposed through a first face and a second face of said first deck plate; and,
        a first wear edge disposed along a lengthwise first side of said first deck plate; and,
    a second deck plate configured to be moveably secured to said top surface of said deck plate assembly, comprising:
        a pair of second fastener slots disposed through a first face and a second face thereof said second deck plate;
        a pair of bell crank pins disposed through said first face and said second face of said second deck plate adjacent each said second fastener slots;
        a plurality of glide buttons disposed through said first face and said second face of said second deck plate adjacent each said second fastener slots and each said bell crank pins; and,
        a second deck plate wear edge disposed along a lengthwise first side of said second deck plate;
        wherein said first wear edge faces said second wear edge and defines a groove therebetween; and,
        wherein said tensioning device permits said groove to adjust based upon a diameter of a given corn stalk passing between said first deck plate and said second deck plate;
    wherein said torque assembly is configured to provide an axially compliant connection between said deck plate control rod and said adjuster arm of said deck plate assembly of said corn head attachment for said combine harvester.

2. The system of claim 1, wherein said first and second wear edges each comprise an abrasion resistant steel.

3. The system of claim 1, wherein said frame assembly further comprises:
    said first side plate having an open and curved first slot along an upper first side thereof;
    said second side plate having an open and curved second slot along an upper first side thereof;
    said third side plate disposed opposite said first slot and said second slot;
    said clamp plate further having opposing parallel pivot features protruding through said first side plate subjacent said first slot and said second side plate subjacent said second slot; and,
    a clamp bolt affixed to said clamp plate engaging with said third side plate subjacent said first slot and said second slot;
    wherein said torque assembly is secured between a lower portion of said first side plate and said second side plate; and, wherein said deck plate control rod is configured to rest within said first slot and said second slot while secured between said clamp plate and said third side plate.

4. The system of claim 1, wherein said plurality of compression elements comprise a rubber material having a durometer and composition permitting said adjuster arm to move radially no more than one inch in a same direction as said torque tube.

5. The system of claim 1, wherein said torque axle has a polygonal cross-section.

6. The system of claim 1, wherein said pivot plate assembly further comprises:
a pivot plate; and,
a pivot plate bushing extending perpendicularly from said pivot plate;
wherein said pivot plate bushing is configured to be inserted within and mechanically attached to said adjuster arm; and,
wherein said torque tube is secured within said pivot plate subjacent said pivot plate bushing.

7. The system of claim 6, wherein said pivot plate bushing is welded to said pivot plate.

8. A tensioning device, comprising:
a frame assembly, having a first side plate, a second side plate disposed parallel to said first side plate, a third side plate perpendicularly secured between said first side plate and said second side plate, and a clamp plate positioned between said first side plate, and said second side plate opposite said third side plate, said clamp plate configured to securely clamp onto a deck plate control rod of a deck plate assembly of a corn head attachment for a combine harvester;
a pivot plate assembly, affixed to a first face of said frame assembly, configured to pivotally attach to an adjuster arm of said deck plate assembly of said corn head attachment for said combine harvester;
a torque assembly, affixed within a lower portion of said frame assembly, comprising:
a hollow torque tube;
a torque axle disposed longitudinally within said torque tube having a first end projecting out of said torque tube, away from said frame assembly and secured within a lower portion of said pivot plate assembly; and,
a plurality of compression elements retained within said torque tube and encompassing said torque axle;
a first deck plate configured to be positioned upon a top surface of said deck plate assembly comprising:
a pair of first fastener slots disposed through a first face and a second face of said first deck plate; and,
a first wear edge disposed along a lengthwise first side of said first deck plate;
a second deck plate configured to be moveably secured to said top surface of said deck plate assembly comprising:
a pair of second fastener slots disposed through a first face and a second face of said second deck plate;
a pair of bell crank pins disposed through said first face and said second face of said second deck plate adjacent each said second fastener slots;
a plurality of glide buttons disposed through said first face and said second face of said second deck plate adjacent each said second fastener slots and each said bell crank pins; and,
a second wear edge disposed along a lengthwise first side of said second deck plate
wherein said first wear edge faces said second wear edge and defines a groove therebetween; and,
wherein said tensioning device permits said groove to adjust based upon a diameter of a given corn stalk passing between said first deck plate and said second deck plate; and,
wherein said torque assembly is configured to provide an axially compliant connection between said deck plate control rod and said adjuster arm of said deck plate assembly of said corn head attachment for said combine harvester.

9. The device of claim 8, wherein said first and second wear edges each comprise an abrasion resistant steel.

10. The device of claim 8, wherein said frame assembly further comprises:
said first side plate having an open and curved first slot along an upper first side thereof;
said second side plate having an open and curved second slot along an upper first side thereof;
said third side plate disposed opposite said first slot and said second slot;
said clamp plate further having opposing parallel pivot features protruding through said first side plate subjacent said first slot and said second side plate subjacent said second slot; and,
a clamp bolt affixed to said clamp plate engaging with said third side plate subjacent said first slot and said second slot;
wherein said torque assembly is secured between a lower portion of said first side plate and said second side plate; and,
wherein said deck plate control rod is configured to rest within said first slot and said second slot while secured between said clamp plate and said third side plate.

11. The device of claim 8, wherein said plurality of compression elements comprise a rubber material having a durometer and composition permitting said adjuster arm to move radially no more than one inch in a same direction as said torque tube.

12. The device of claim 8, wherein said torque axle has a polygonal cross-section.

13. The device of claim 8, wherein said pivot plate assembly further comprises:
a pivot plate; and,
a pivot plate bushing extending perpendicularly from said pivot plate;
wherein said pivot plate bushing is configured to be inserted within and mechanically attached to said adjuster arm; and,
wherein said torque tube is secured within said pivot plate subjacent said pivot plate bushing.

14. The device of claim 13, wherein said pivot plate bushing is welded to said pivot plate.

* * * * *